(12) United States Patent
Hirata et al.

(10) Patent No.: US 8,542,559 B2
(45) Date of Patent: Sep. 24, 2013

(54) THERMALLY-ASSISTED MAGNETIC RECORDING HEAD HAVING PHOTOELECTRIC WIRING LINES INTEGRALLY FORMED ON WAVEGUIDE

(75) Inventors: Masakazu Hirata, Chiba (JP); Manabu Oumi, Chiba (JP); Mizuaki Suzuki, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 114 days.

(21) Appl. No.: 12/736,985

(22) PCT Filed: May 15, 2009

(86) PCT No.: PCT/JP2009/059070
§ 371 (c)(1),
(2), (4) Date: Apr. 22, 2011

(87) PCT Pub. No.: WO2009/147941
PCT Pub. Date: Dec. 10, 2009

(65) Prior Publication Data
US 2011/0199868 A1    Aug. 18, 2011

(30) Foreign Application Priority Data
Jun. 2, 2008 (JP) ................................ 2008-144788

(51) Int. Cl.
*G11B 11/00* (2006.01)
(52) U.S. Cl.
USPC ..................................... 369/13.33; 369/13.13
(58) Field of Classification Search
USPC .......... 369/13.13, 13.33, 13.32, 13.02, 13.17,
369/112.09, 112.14, 112.21, 112.27, 300;
360/59; 385/129, 31, 88–94;
29/603.07–603.27; 250/201.3, 201.5
See application file for complete search history.

(56) References Cited

U.S. PATENT DOCUMENTS

| | | | |
|---|---|---|---|
| 2008/0115962 A1* | 5/2008 | Juni et al. ...................... | 174/250 |
| 2008/0130155 A1 | 6/2008 | Naniwa et al. .................. | 360/59 |
| 2010/0039733 A1* | 2/2010 | Liu et al. ..................... | 360/265.6 |
| 2010/0085664 A1* | 4/2010 | Hirata et al. ............... | 369/13.33 |
| 2010/0277827 A1* | 11/2010 | Wood et al. ..................... | 360/75 |

(Continued)

FOREIGN PATENT DOCUMENTS

| JP | 2003 077233 | 3/2003 |
|---|---|---|
| JP | 2007 335027 | 12/2007 |
| JP | 2008 097772 | 4/2008 |

OTHER PUBLICATIONS

Computer Translation of JP-2008-097772, Pub date Apr. 24, 2008.*

*Primary Examiner* — Tan X Dinh
(74) *Attorney, Agent, or Firm* — Adams & Wilks

(57) ABSTRACT

An information recording and reproduction apparatus has a magnetic recording medium and a carriage that undergoes rotational movement about a pivot shaft and has a base portion and an arm portion extending from the base portion and along a surface of the medium. A light source that emits a light beam to heat the medium is mounted on the base portion and is disposed closer to the pivot shaft than the arm portion. The arm portion supports a slider confronting the surface of the medium and being configured to receive a light beam from the light source. The slider has an optical system which condenses the light beam and a spot light generating element which generates from the condensed light beam spot light that heats the medium for recording information on the medium while causing magnetization reversal by applying a recording magnetic field to the medium.

11 Claims, 7 Drawing Sheets

(56) References Cited

U.S. PATENT DOCUMENTS

| | | | |
|---|---|---|---|
| 2011/0075527 A1* | 3/2011 | Hirata et al. | 369/13.33 |
| 2011/0122738 A1* | 5/2011 | Hirata et al. | 369/13.32 |
| 2011/0188355 A1* | 8/2011 | Hirata et al. | 369/13.33 |
| 2011/0188356 A1* | 8/2011 | Hirata et al. | 369/13.33 |
| 2011/0194809 A1* | 8/2011 | Nishio et al. | 369/13.33 |

* cited by examiner

FIG. 4
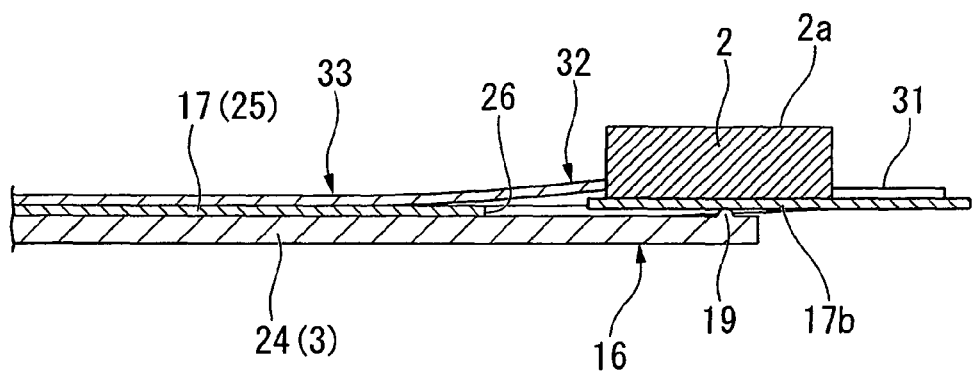
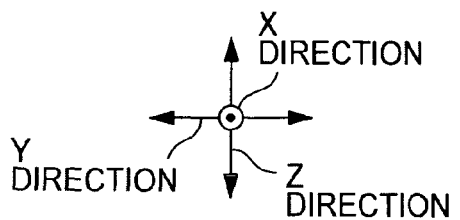
FIG. 5
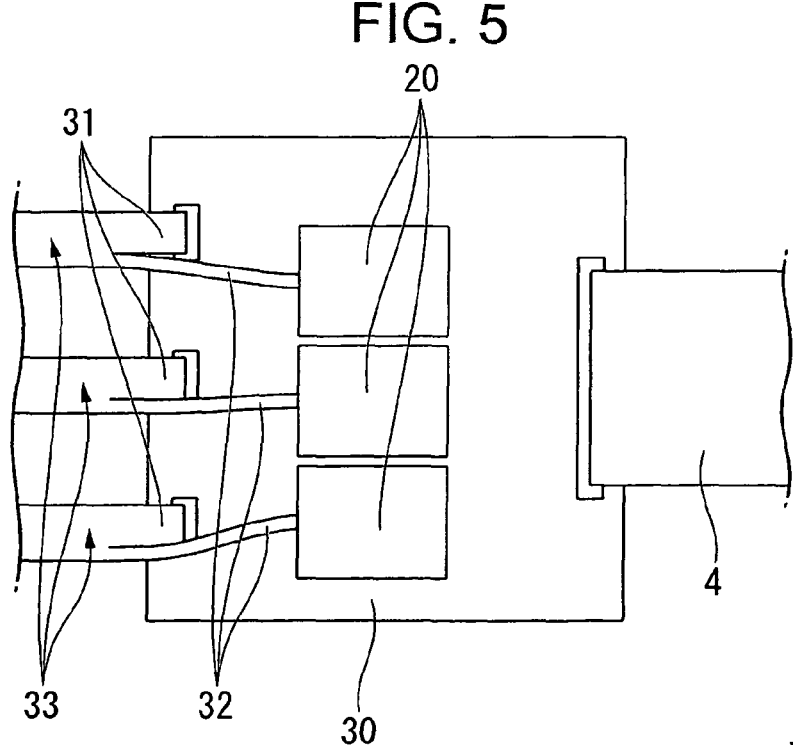
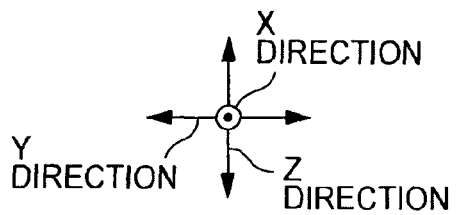

THERMALLY-ASSISTED MAGNETIC RECORDING HEAD HAVING PHOTOELECTRIC WIRING LINES INTEGRALLY FORMED ON WAVEGUIDE

CROSS-REFERENCE TO RELATED APPLICATIONS

This application is a U.S. national stage application of International Application No. PCT/JP2009/059070 filed May 15, 2009, claiming a priority date of Jun. 2, 2008, and published in a non-English language.

BACKGROUND OF THE INVENTION

1. Technical Field

The present invention relates to an information recording and reproduction apparatus which records and reproduces various kinds of information on and from a magnetic recording medium using spot light obtained by a condensing light beam.

2. Background Art

In recent years, the recording density of the information within a single recording surface has been increasing with increases in the capacity of a hard disk or the like in a computer apparatus. For example, in order to increase the recording capacity per unit area of a magnetic disk, it is necessary to increase the surface recording density. However, as the recording density increases, the recording area per bit occupied on a recording medium decreases. If the bit size is reduced, the energy of the 1-bit information becomes close to heat energy at room temperature. As a result, a problem of thermal demagnetization occurs. For example, the recorded information is reversed or lost due to thermal fluctuation or the like.

An in-plane recording method generally used is a method of performing magnetic recording such that the direction of magnetization faces an in-plane direction of a recording medium. In this method, however, loss of the recording information by thermal demagnetization described above and the like easily occur. Therefore, in order to solve such a problem, there is a shift to a perpendicular recording method which records a magnetization signal in a vertical direction with respect to a recording medium. This method is a method of recording the magnetic information on a recording medium under the principle of bringing single poles close to each other. According to this method, the recording magnetic field faces an almost vertical direction with respect to a recording layer. Since it is difficult for an N pole and an S pole to make a loop within a recording layer surface, the information recorded in a perpendicular magnetic field tends to maintain the stability in terms of energy. For this reason, this perpendicular recording method is stronger against the thermal demagnetization as compared to the in-plane recording method.

However, in recent years, there has been a demand for recording media to have a higher density according to the need for the recording and reproduction of a larger amount of information with higher density. Accordingly, in order to suppress to a minimum an influence between adjacent magnetic domains or thermal fluctuation, recording media with strong coercivity have started to be adopted. For this reason, even in the perpendicular recording method described above, it has been difficult to record the information on a recording medium.

Therefore, in order to solve this problem, there is provided a hybrid magnetic recording method of temporarily reducing the coercivity by locally heating a magnetic domain using spot light, which is obtained by condensing light beam, or near-field light, which is obtained by condensing light beam, and performing writing in the meantime. In particular, when using near-field light, it becomes possible to treat the optical information in a region with a wavelength of light or less, which was not possible in a conventional optical system. Consequently, it is possible to realize high density of recording bits exceeding conventional optical information recording and reproduction apparatus and the like.

Various items are provided as information recording and reproduction apparatuses based on the hybrid magnetic recording method described above. As one of them, there is known an information recording and reproduction apparatus capable of realizing reproduction and recording with super-high resolution, high-speed recording and reproduction, and a high S/N ratio by generating sufficiently large near-field light from a fine aperture by supplying light for generating near-field light to a near-field light head.

As this information recording and reproduction apparatus, there is known a configuration which includes a driving arm (carriage), which can angle-oscillate around a pivot bearing shaft by a voice coil motor (VCM) or the like, and in which a slider provided with a near-field light head is fixed to a distal end of the driving arm. This slider includes a unit substrate bonded to an opposite surface to an ABS-side surface (floating surface) of the slider, that is, an upper surface of the slider, a light source provided on the unit substrate, a propagation layer which is provided on an element forming surface of the unit substrate and which includes an optical path of light emitted from the light source, and a lens section which is provided in the propagation layer in order to adjust propagation of the light emitted from the light source, as disclosed in Patent Document 1, for example.

The information recording and reproduction apparatus described above disposes the slider at the desired position on a disk by making the slider perform scanning on the disk by moving the driving arm around the pivot bearing shaft. Then, the near-field light emitted from the light source and the recording magnetic field generated from the slider are made to cooperate with each other so that the information can be recorded on the disk. In addition, the ABS of the slider is configured to float such that when air pressure is applied to the slider by the undulation of a disk or the like, it follows the air pressure.

RELATED ART

Citation List

[Patent Document 1] Japanese Unexamined Patent Publication No. 2007-335027

In the conventional information recording and reproduction apparatus described above, however, the light source is mounted on the unit substrate bonded to the upper surface of the slider. Accordingly, since the heat generated from the light source is directly transferred to the slider, the slider is heated. If the slider is heated, the slider may warp or thermal expansion may occur. The ABS of the slider described above is configured such that the slider floats according to air pressure when the air pressure is applied to the slider by the undulation of a disk or the like. If this ABS deforms by warpage or thermal expansion of the slider, there is a problem that the floating characteristic of the slider changes.

In addition, if the slider is heated, the characteristic and the like of a reproduction element of the slider are affected.

Accordingly, recording and reproduction of the information may not be controlled very accurately and correctly.

In addition, a slider moves in parallel to a disk surface with a pivot bearing shaft of a driving arm as the center of rotation, but the moment acting on the driving arm when the slider moves becomes large if a light source is mounted in the slider. Accordingly, there is a problem in that the tracking accuracy is reduced.

Therefore, the present invention has been made in view of the foregoing problems, and it is an object of the present invention to provide an information recording and reproduction apparatus capable of performing recording and reproduction of the information very accurately and correctly by suppressing an influence of heat generated from a light source and suppressing the moment acting on a carriage when a slider moves.

SUMMARY OF THE INVENTION

The present invention provides the following means in order to solve the problem.

An information recording and reproduction apparatus related to the present invention includes: a magnetic recording medium which rotates in a fixed direction; a light source which emits light beam in order to heat the magnetic recording medium; a pivot shaft disposed at the outside of the magnetic recording medium; and a carriage formed so as to be rotatable around the pivot shaft. The carriage includes a base portion, which is formed so as to be rotatable around the pivot shaft, and an arm portion, which is provided to extend from the base portion along a surface of the magnetic recording medium. A suspension configured to be flexibly deformable in a thickness direction is fixed to a distal end of the arm portion, and a slider is supported by the suspension so as to face the surface of the magnetic recording medium. The slider includes an optical system which condenses light beam emitted from the light source and a spot light generating element which generates spot light from the condensed light beam. The information recording and reproduction apparatus records the information on the magnetic recording medium by heating the magnetic recording medium with the spot light and causing magnetization reversal by applying a recording magnetic field to the magnetic recording medium and is characterized in that the light source is disposed in the base portion and an optical waveguide, which introduces the light beam emitted from the light source into the slider, is provided.

In the information recording and reproduction apparatus related to the present invention, the information can be recorded on a magnetic recording medium, such as a rotating optical disk, by a hybrid magnetic recording method of making spot light and a recording magnetic field cooperate with each other. First, the slider supported at the tip of the arm portion is moved in a direction parallel to the surface of the magnetic recording medium in order to scan the magnetic recording medium. Accordingly, the slider can be located at the desired position on the magnetic recording medium. Then, light beam are guided to the slider by the optical waveguide. Then, the light beam guided to the slider is condensed by the optical system. Then, the spot light generating element can generate spot light from the condensed light beam. In addition, the spot light generating element is formed by an optically fine aperture, a protruding portion formed in a nanometer size, and the like.

In addition, the magnetic recording medium is locally heated by the spot light and accordingly, the coercivity is temporarily reduced. As a result, various kinds of information can be recorded and reproduced on and from the recording medium using the slider.

In particular, according to the information recording and reproduction apparatus of the present invention, the light source which supplies light beam to the optical system of the slider is provided in the base portion of the slider. In addition, light beam emitted from the light source are guided to the slider, which is supported at the distal end of the arm portion, through the optical waveguide. The light beam guided to the slider are condensed by the optical system described above and are then introduced into the spot light generating element. Accordingly, spot light is incident on the magnetic recording medium. That is, unlike the case where a light source is directly mounted in a slider in the related art, a possibility that the heat generated from the light source when supplying light beam will be transmitted to the slider is very small because light beam are supplied from the light source, which is provided in the base portion of the carriage, to the slider through the optical waveguide. Therefore, an influence of the heat generated from the light source can be suppressed. Accordingly, it is possible to prevent deformation of the slider caused by the influences of thermal expansion, warpage, and the like of the slider. In addition, the characteristic of the reproduction element of the slider can be maintained.

In addition, since the base portion of the carriage is configured so as to be rotatable around the pivot shaft, the arm portion is configured so as to be movable in a direction parallel to the surface of the magnetic recording medium with the pivot shaft as the center of rotation. At this time, by providing the light source in the base portion, the moment acting on the carriage when the slider moves is small compared with the case where the light source is mounted in the slider. Accordingly, the tracking accuracy can be maintained.

Thus, according to the information recording and reproduction apparatus related to the present invention, recording and reproduction of the information can be performed very accurately and correctly by suppressing the influence of the heat generated from the light source and suppressing the moment acting on the carriage when the slider moves.

Moreover, the information recording and reproduction apparatus related to the present invention is characterized in that a terminal substrate which electrically connects a control unit, which controls an operation of the slider, and the slider to each other is provided in the base portion and the light source is disposed on the terminal substrate.

In the information recording and reproduction apparatus related to the present invention, the light source is disposed on the terminal substrate provided in the base portion of the carriage. The terminal substrate serves as a relay point with the control unit which controls an operation of the slider, and is disposed conventionally in the base portion of the carriage. That is, since the light source is only disposed on the existing component, it is not necessary to deploy a new component as a base in the carriage in order to position the light source. As a result, costs can be reduced.

Moreover, the information recording and reproduction apparatus related to the present invention is characterized in that a polarization controller, which adjusts a polarization component of light beam emitted from the light source, is fixed to the light source.

In the information recording and reproduction apparatus related to the present invention, spot light generated by the spot light generating element can be intensively localized by guiding light beam to the optical system after adjusting a polarization component with the polarization controller. As a result, recording can be realized with higher density.

Moreover, the information recording and reproduction apparatus related to the present invention is characterized in that the plurality of arm portions is supported on the base portion and the plurality of light sources is provided corresponding to the slider supported by the plurality of arm portions.

In the information recording and reproduction apparatus related to the present invention, since the plurality of arm portions is provided, the information can be recorded on a plurality of magnetic recording media by the slider supported by each arm portion. Accordingly, the recording capacity of the apparatus itself can be increased. In addition, by providing a light source corresponding to each slider, the information can be recorded on all magnetic recording media corresponding to respective sliders by the hybrid magnetic recording method. Accordingly, high-density recording of each magnetic recording medium can be realized.

Moreover, the information recording and reproduction apparatus related to the present invention is characterized in that the plurality of arm portions is supported on the base portion and an optical distributor, which distributes light beam to the slider supported by the plurality of arm portions, is fixed to the light source.

In the information recording and reproduction apparatus related to the present invention, since the plurality of arm portions is provided, the information can be recorded on a plurality of magnetic recording media by the slider supported by each arm portion. Accordingly, the recording capacity of the apparatus itself can be increased. In addition, since the optical distributor is fixed to the light source, light beam emitted from the light source can be supplied to designated singular or plural sliders by switching the optical distributor. Accordingly, since it is not necessary to provide a light source corresponding to the number of sliders, the cost of the apparatus can be reduced.

According to the information recording and reproduction apparatus related to the present invention, recording and reproduction of the information can be performed very accurately and correctly by suppressing an influence of heat generated from a light source and suppressing the moment acting on a carriage when a slider moves.

BRIEF DESCRIPTION OF DRAWINGS

FIG. 4 is a cross-sectional view taken along the line E-E' of FIG. 3.

FIG. 5 is a plan view of a terminal substrate shown in FIG. 1.

DETAILED DESCRIPTION OF THE INVENTION

Information Recording and Reproduction Apparatus

Figure 1:
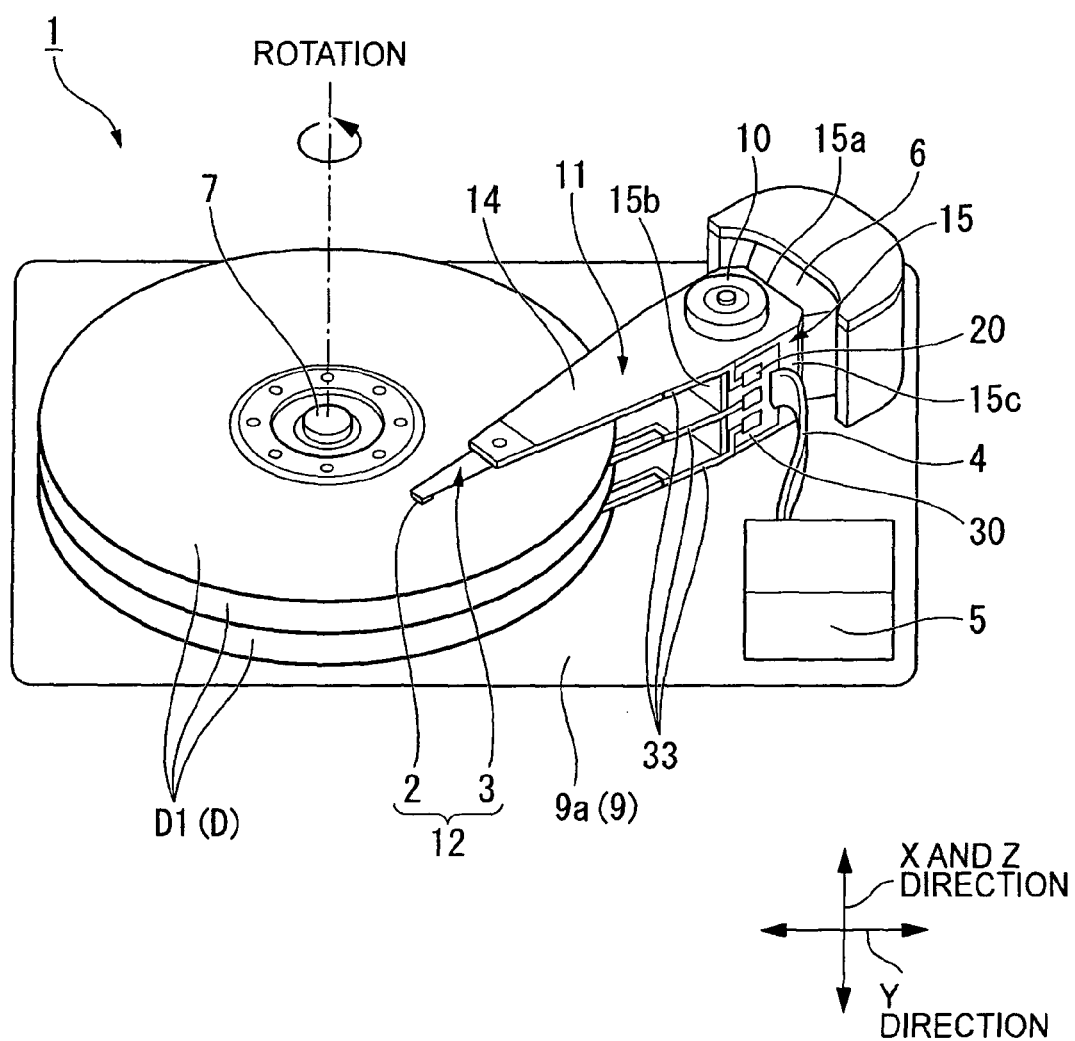
FIG. 1 is a view showing the configuration of an embodiment of an information recording and reproduction apparatus related to the present invention.

Hereinafter, an embodiment related to the present invention will be described with reference to FIGS. 1 to 7. FIG. 1 is a view showing the configuration of a first embodiment of an information recording and reproduction apparatus 1 related to the present invention. In addition, the information recording and reproduction apparatus 1 of the present embodiment is an apparatus which performs writing on a disk (magnetic recording medium) D, which has a perpendicular recording layer, by a perpendicular recording method.

As shown in FIG. 1, the information recording and reproduction apparatus 1 of the present embodiment includes: a carriage 11; a laser light source 20 which supplies light beam from the base end side of the carriage 11 through a photoelectric composite wiring line 33; a head gimbal assembly (HGA) 12 supported on the distal side of the carriage 11; an actuator 6 which makes the head gimbal assembly 12 perform scan movement in the XY direction parallel to a disk surface D1 (surface of a disk D); a spindle motor 7 which rotates the disk D in a predetermined direction; a control unit 5 which supplies a current, which is modulated according to the information, to a slider 2 of the head gimbal assembly 12; and a housing 9 in which these respective constituent components are housed.

The housing 9 is formed of a metal material, such as aluminum, has a box shape with an upper opening, and is configured to include a bottom portion 9a with a rectangular shape when viewed from above and a peripheral wall (not shown) provided in a direction perpendicular to the bottom portion 9a in the peripheral edge of the bottom portion 9a. In addition, a recess in which each of the constituent components described above is housed is formed at the inside surrounded by the peripheral wall. Moreover, in FIG. 1, the peripheral wall which surrounds the periphery of the housing 9 is omitted for easy understanding of the explanation.

In addition, a lid (not shown) is detachably fixed to the housing 9 so as to cover the opening of the housing 9. The spindle motor 7 is fixed to approximately the middle of the bottom portion 9a, and the disk D is detachably fixed by inserting a center hole into the spindle motor 7.

The actuator 6 is fixed at the outer side of the disk D, that is, in the corner of the bottom portion 9a. The carriage 11 which is rotatable in the XY direction around a pivot shaft 10 is fixed to the actuator 6.

The carriage 11 is obtained by integrally forming an arm portion 14, which is provided to extend from the base end toward the distal end along the disk surface D1, and a base portion 15, which supports the arm portion 14 through the base end like a cantilever, by cutting processing or the like.

The base portion 15 is formed in a rectangular parallelepiped shape and is supported so as to be able to rotate around the pivot shaft 10. That is, the base portion 15 is connected to the actuator 6 through the pivot shaft 10, and the pivot shaft 10 is the center of rotation of the carriage 11.

The arm portion 14 has a plate shape extending in parallel to the surface direction (XY direction) of the upper surface of the base portion 15 on a side surface (side surface opposite a corner) 15b of the base portion 15 opposite a side surface 15a to which the actuator 6 is fixed, and three arm portions 14 extend along the height direction (Z direction) of the base portion 15. Specifically, the arm portion 14 is formed in a tapered shape which tapers from the base end toward the distal end, and is disposed so that the disk D is inserted between the respective arm portions 14. That is, the arm portion 14 and the disk D are alternately disposed, and the arm portion 14 is made to be movable in a direction (XY direction) parallel to the surface of the disk D by driving of the actuator 6. In addition, the carriage 11 and the head gimbal assembly 12 move back from over the disk D by driving of the actuator 6 at the stop of rotation of the disk D.

The head gimbal assembly 12 generates near-field light (spot light) by guiding light beam from the laser light source 20 to the slider 2, which is a near-field light head having a near-field light generating element (spot light generating element; not shown), and records and reproduces various kinds of information on and from the disk D using the near-field light. In addition, the near-field light generating element is formed by an optically fine aperture, a protruding portion formed in a nanometer size, and the like, for example.

Figure 2:
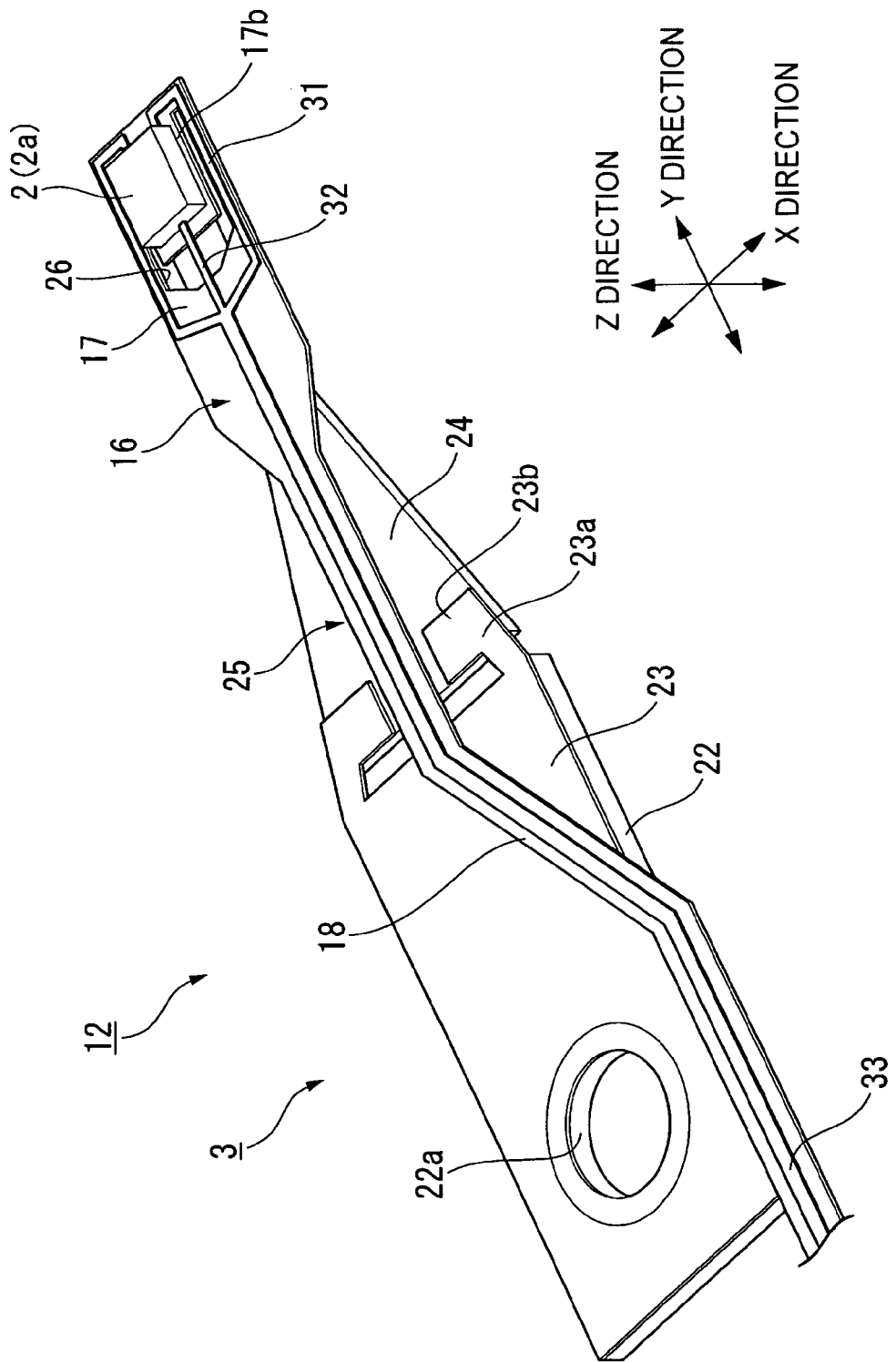
FIG. 2 is a perspective view of a head gimbal assembly shown in FIG. 1.
Figure 3:
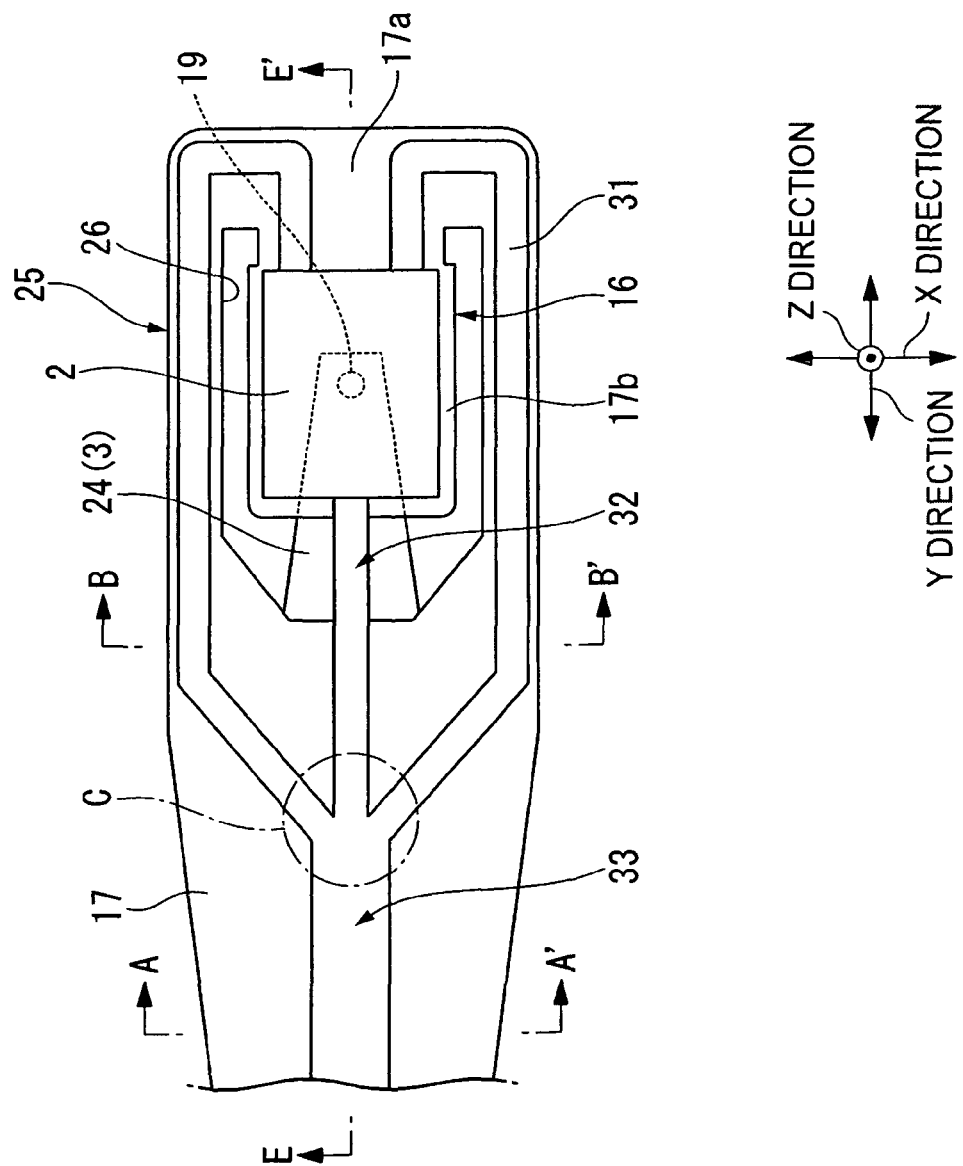
FIG. 3 is a plan view of a gimbal shown in FIG. 2.

FIG. 2 is a perspective view when a suspension 3 is viewed from the slider 2 side in a state where the slider 2 is in the upward direction. FIG. 3 is a plan view when a gimbal 17 is viewed in a state where the slider 2 is in the upward direction. FIG. 4 is a cross-sectional view taken along the line E-E' of FIG. 3, and is a sectional view of the tip of the suspension 3 in a state where the slider 2 is in the upward direction.

As shown in FIGS. 2 to 4, the head gimbal assembly 12 of the present embodiment functions as a suspension, which makes the slider 2 float from the disk D, and includes the slider 2, the suspension 3 which is formed in a thin plate shape by a metal material and is movable in the XY direction parallel to the disk surface D1, and a gimbal means 16 for fixing the slider 2 to the bottom surface of the suspension 3 in a state rotatable around two axes (X and Y axes) which are parallel to the disk surface D1 and are perpendicular to each other, that is, so as to be able to be twisted around the two axes.

First, the slider 2 is supported on the bottom surface of the suspension 3 with the gimbal 17, which will be described later, interposed therebetween in a state disposed between the disk D and the suspension 3. The slider 2 includes a reproduction element (not shown), which is fixed to the distal side, and a recording element (not shown), which is fixed adjacent to the reproduction element. In addition, the slider 2 has a condensing lens (optical system; not shown), which is provided at the opposite side of the reproduction element with the recording element interposed therebetween and which condenses light beam emitted from the laser light source 20, and the near-field light generating element which generates near-field light from the light beam condensed by the condensing lens. That is, in the slider 2, a reproduction element, a recording element, and a near-field light generating element are located in a line at the distal end.

In addition, the bottom surface of the slider 2 is a floating surface 2a facing the disk surface D1. The floating surface 2a is a surface which generates pressure for floating by the viscosity of airflow generated by the rotating disk D, and is called an ABS (Air Bearing Surface). Specifically, it is designed such that the slider 2 floats in the optimal state by adjusting positive pressure, which separates the slider 2 from the disk surface D1, and negative pressure, which pulls the slider 2 to the disk surface D1.

The slider 2 receives a force floating from the disk surface D1 by the floating surface 2a and also receives a force pressed toward the disk D by the suspension 3. In addition, the slider 2 floats from the disk surface D1 by the balance of both the forces.

The suspension 3 is formed by a base plate 22, which is formed in an approximately rectangular shape when viewed from above, and a load beam 24, which is connected to the distal side of the base plate 22 through a hinge plate 23 and has an approximately triangular shape when viewed from above.

The base plate 22 is formed of a metal material with a thin thickness, such as stainless steel, and an opening 22a passing therethrough in the thickness direction is formed at the base end side. In addition, the base plate 22 is fixed to the tip of the arm portion 14 through the opening 22a. The hinge plate 23 with a sheet shape formed of a metal material, such as stainless steel, is disposed on the bottom surface of the base plate 22. The hinge plate 23 has a plate shape formed on the entire bottom surface of the base plate 22, and the distal end is formed as an extending portion 23a which extends from the tip of the base plate 22 along the longitudinal direction of the base plate 22. Two extending portions 23a extend from both ends of the hinge plate 23 in the width direction, and enlarged portions 23b whose widths expand to the inner side in the width direction, that is, in a direction facing the extending portions 23a are formed at the distal ends. The load beam 24 is connected to the upper surface of the enlarged portion 23b.

The load beam 24 is formed by a metal material with a thin thickness, such as stainless steel, similar to the base plate 22 and is connected to the hinge plate 23 with a gap between the base end and the tip of the base plate 22. Accordingly, a suspension 3 is bent between the base plate 22 and the load beam 24, and bends easily toward a Z direction perpendicular to the disk surface D1.

A flexure 25 is provided on the suspension 3. The flexure 25 has a sheet shape formed of a metal material, such as stainless steel, and is formed so as to be flexibly deformable in the thickness direction due to being formed in the sheet shape. The flexure 25 is formed by the gimbal 17, which is fixed to the distal side of the load beam 24 and has an appearance formed in an approximately pentagon shape when viewed from above, and a support 18, which is formed to have a narrower width than the gimbal 17 and extends from the base end of the gimbal 17 along the top of the suspension 3.

As shown in FIGS. 3 and 4, from the vicinity of the middle to the tip, the gimbal 17 is formed so as to be slightly warped in the thickness direction toward the disk surface D1. In addition, the gimbal 17 is fixed to the load beam 24 from the base end side to the approximate middle so that the warped distal side is not in contact with the load beam 24.

In addition, a notched portion 26 with the periphery bored in a U shape is formed at the distal side of the gimbal 17 in the floating state, and a pad portion 17b supported like a cantilever by a connecting portion 17a is formed in a portion surrounded by the notched portion 26. That is, since the pad portion 17b is easily bent in the thickness direction of the gimbal 17, only the pad portion 17b is angle-adjusted so as to be parallel to the bottom surface of the suspension 3. In addition, the slider 2 is placed and fixed on the pad portion 17b. That is, the slider 2 is in a state hanging on the load beam 24 with the pad portion 17b interposed therebetween.

In addition, a protruding portion 19 which protrudes toward the approximate middle of the pad portion 17b and the slider 2 is formed at the tip of the load beam 24. The tip of the protruding portion 19 is rounded. In addition, the protruding portion 19 is in point contact with the surface (upper surface) of the pad portion 17b when the slider 2 floats to the load beam 24 sides by air pressure received from the disk D. This floating force is transmitted from the protruding portion 19 to the load beam 24 and acts to bend the hinge plate 23. In addition, when air pressure in the XY direction is applied to the slider 2 by the undulation of the disk D or the like, the slider 2 and the pad portion 17b are twisted around two axes of X and Y axes with the protruding portion 19 as the center. Accordingly, since displacement in the Z direction (displacement in a direction approximately perpendicular to the disk surface D1) caused by the undulation of the disk D can be absorbed, the posture of the slider 2 is stabilized. In addition, the protruding portion 19 and the gimbal 17 having the pad portion 17b form the gimbal means 16.

The support 18 shown in FIG. 2 has a sheet shape integrally formed in the gimbal 17 and is provided to extend toward the arm portion 14 on the suspension 3. That is, the support 18 is formed to follow deformation of the suspension 3 when the suspension 3 deforms. The support 18 turns to the side surface from the top of the arm portion 14 to be routed until it reaches the base portion 15 of the arm portion 14.

FIG. 5 is a plan view of a terminal substrate 30 fixed to the base portion 15 of the carriage 11.

As shown in FIGS. 1 and 5, the terminal substrate 30 is disposed on a side surface 15c in the base portion 15 of the carriage 11. The terminal substrate 30 serves as a relay point when electrically connecting the control unit 5 and the slider 2 provided in the housing 9, and various control circuits are formed on the surface. While the control unit 5 and the terminal substrate 30 are electrically connected by a flexible flat cable 4, the terminal substrate 30 and the slider 2 are connected by an electric wiring line 31. Three sets of electric wiring lines 31 are provided corresponding to the number of sliders 2 provided for each carriage 11, such that a signal output from the control unit 5 through the flat cable 4 is output to the slider 2 through the electric wiring lines 31.

In addition, the laser light source 20 which supplies light beam toward the condensing lens of the slider 2 is disposed on the terminal substrate 30. The laser light source 20 receives a signal output from the control unit 5 through the flat cable 4 and emits light beam on the basis of the signal. Three laser light sources 20 are disposed along the height direction (Z direction) of the base portion 15 corresponding to the number of sliders 2 provided in each arm portion 14. An optical waveguide 32 which guides a light beam emitted from each laser light source 20 to the condensing lens of the slider 2a is connected to the emission side of each laser light source 20.

Figure 6:
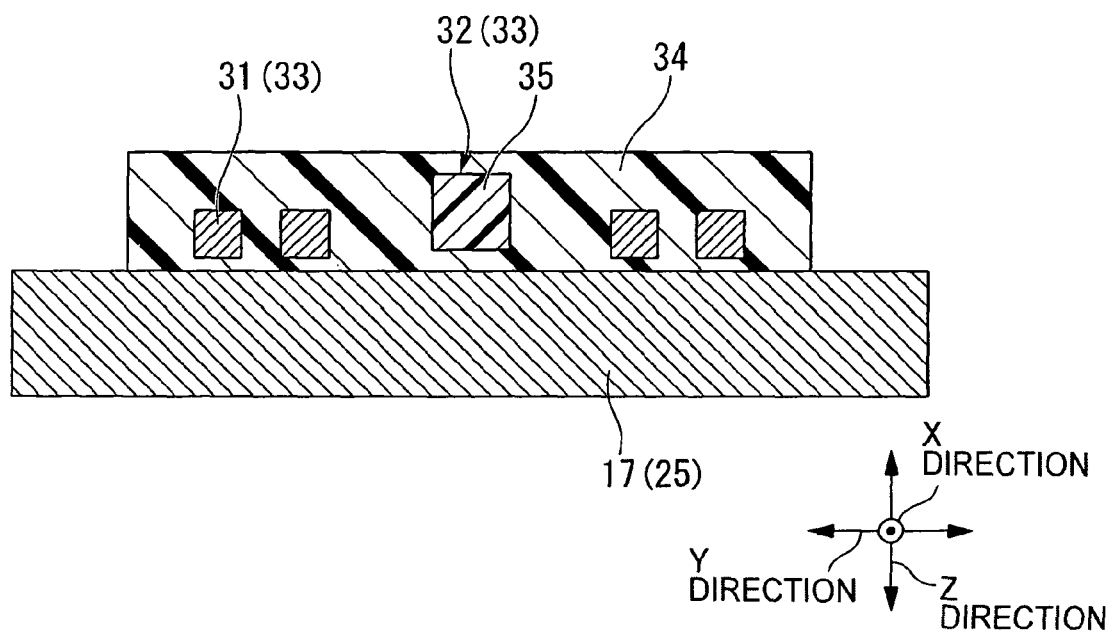
FIG. 6 is a cross-sectional view taken along the line A-A' of FIG. 3.
Figure 7:
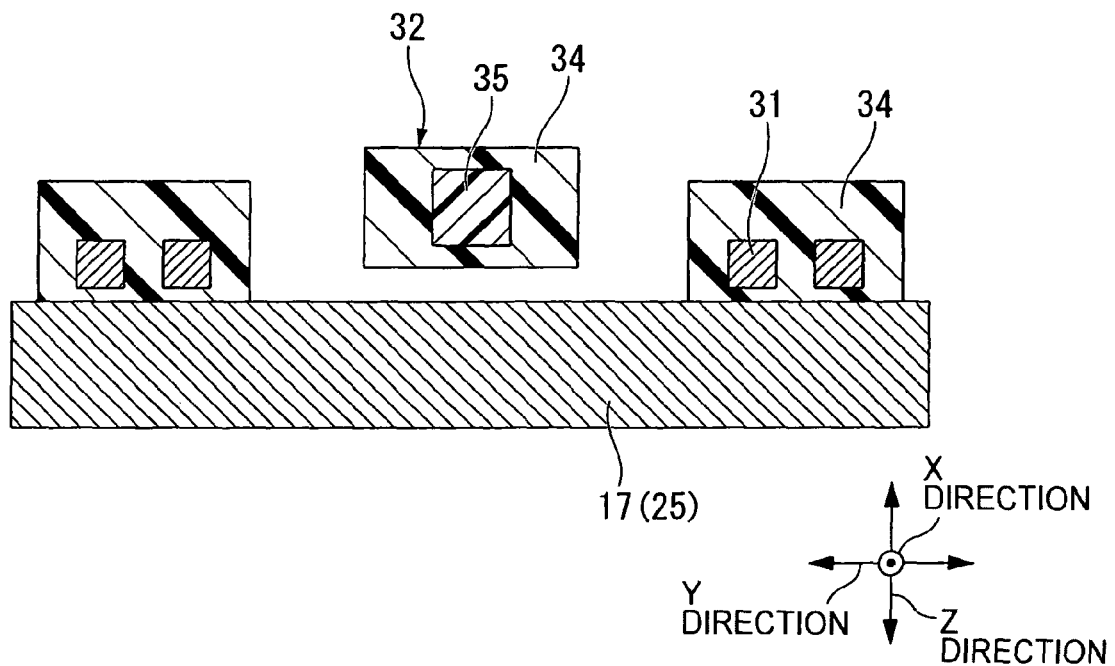
FIG. 7 is a cross-sectional view taken along the line B-B' of FIG. 3.

FIG. 6 is a cross-sectional view taken along the line A-A' of FIG. 3, and FIG. 7 is a cross-sectional view taken along the line B-B' of FIG. 3.

As shown in FIGS. 3 and 5 to 7, one optical waveguide 32 and one set of electric wiring lines 31 corresponding to each slider 2 are put together from the base end side to the distal end to be formed as the photoelectric composite wiring line 33 in which they are integrally formed. The photoelectric composite wiring line 33 is integrally formed by sealing the optical waveguide 32 and the electric wiring line 31 with a cladding 34 and is routed from the surface of the terminal substrate 30 onto the arm portion 14 while passing the side surface of the arm portion 14. The photoelectric composite wiring line 33 is disposed on the support 18 (refer to FIG. 2) of the flexure 25 on the arm portion 14 and the suspension 3, and is routed to the tip of the suspension 3 with the support 18 interposed therebetween.

The optical waveguide 32 which forms the photoelectric composite wiring line 33 is formed by a core 35 and the cladding 34 with different refractive indices, and light beam emitted from the laser light source 20 are guided to the condensing lens of the slider 2 in the total reflection condition due to the difference between the refractive indices of the core 35 and the cladding 34.

In addition, if an example of the combination of materials used as the cladding 34 and the core 35 is described, a combination may be considered in which the core 35 is formed in a thickness of 3 to 10 µm, for example, by PMMA (polymethyl methacrylate) and the cladding 34 is formed in a thickness of tens of micrometers by a fluorine-containing polymer. In addition, both the core 35 and the cladding 34 may be formed of epoxy resin (for example, the refractive index of the core is 1.522 to 1.523, and the refractive index of the cladding is 1.518 to 1.519) or may be formed of fluorinated polyimide. In addition, since the force which traps light beam in the core 35 increases as the difference between the refractive indices of the core 35 and the cladding 34 increases, it is preferable to increase the difference between the refractive indices by adjusting the mixing of resin materials which form the core 35 and the cladding 34. For example, in the case of fluorinated polyimide, the refractive indices can be controlled by adjusting the fluorine content or by energy irradiation of emitted light or the like.

Moreover, a combination may also be considered in which the core 35 is formed of quartz ($SiO_2$) and the cladding 34 is formed of quartz doped with fluorine, for example. In this case, since the refractive index of the core 35 is 1.47 and the refractive index of the cladding 34 is less than 1.47 when the wavelength of a light beam is 400 nm, it is a preferable combination. Moreover, a combination may also be considered in which the core 35 is formed of quartz doped with germanium and the cladding 34 is formed of quartz ($SiO_2$). In this case, since the refractive index of the core 35 is larger than 1.47 and the refractive index of the cladding 34 is 1.47 when the wavelength of a light beam is 400 nm, it is also a preferable combination.

As shown in FIGS. 6 and 7, in the photoelectric composite wiring line 33, the core 35 of the optical waveguide 32 is disposed in the middle of the cladding 34 in the width direction (YZ plane) in sectional view, and two electric wiring lines 31 are disposed at each of both sides of the optical waveguide 32 so as to interpose the optical waveguide 32 therebetween. That is, the photoelectric composite wiring line 33 is formed so as to be symmetric with respect to the core 35. Thus, since both the core 35 and the electric wiring line 31 are sealed with the cladding 34, they are formed as the photoelectric composite wiring line 33 in which the optical waveguide 32 and the electric wiring line 31 are integrally formed.

Moreover, as shown in FIG. 3, the photoelectric composite wiring line 33 branches off to the electric wiring line 31 and the optical waveguide 32 at the tip of the suspension 3, specifically, at the middle position of the gimbal 17. The radius of curvature of the optical waveguide 32 from this branch point C to the slider 2 is larger than the radius of curvature of the electric wiring line 31.

Specifically, the optical waveguide 32 extends along the longitudinal direction of the gimbal 17 from the branch point C at the distal side of the photoelectric composite wiring line 33 and is directly connected to the base end side of the slider 2 across the notched portion 26 of the gimbal 17. The optical waveguide 32 is separated from the bottom surface of the gimbal 17 at the branch point C of the photoelectric composite wiring line 33, and extends in a slightly floating state from the branch point C toward the base end side of the slider 2 so as to be stretched over between the pad portion 17b and the gimbal 17. That is, on the bottom surface of the gimbal 17, the optical waveguide 32 is routed to the base end surface side of the slider 2 in a state extending approximately linearly (radius of curvature is approximately infinite). The optical waveguide 32 routed to the base end surface side of the slider 2 is connected to the near-field light generating element, which is provided at the distal surface side of the slider 2, through the condensing lens in the slider 2.

On the other hand, at the branch point C, the electric wiring line 31 is bent toward a peripheral portion of the gimbal 17 and is routed from the peripheral portion of the gimbal 17, that is, from the outside of the notched portion 26. In addition, the electric wiring line 31 routed from the outside of the notched portion 26 is connected to the distal surface side of the slider 2 through the connecting portion 17a. That is, the electric wiring line 31 is directly connected, from the outside of the slider 2, to the reproduction element or the recording element provided at the distal surface side of the slider 2.

Next, the case of recording and reproducing various kinds of information on and from the disk D using the information recording and reproduction apparatus 1 configured as described above will be described below.

First, the spindle motor 7 is driven to rotate the disk D in a predetermined direction. Then, the actuator 6 is operated to rotate the carriage 11 around the pivot shaft 10 as the center of rotation, so that the head gimbal assembly 12 performs scanning in the XY direction through the carriage 11. Thus, the slider 2 can be located at the desired position on the disk D.

Subsequently, light beams from the laser light source 20 are incident on the optical waveguide 32 (photoelectric composite wiring line 33) and are then guided to the slider 2. That is, light beams are guided from the base end side of the suspension 3 to the distal side by the optical waveguide 32, and the light beams are also guided to the slider 2. Then, the light beams guided to the slider 2 is condensed by the condensing lens. Accordingly, near-field light is generated around the near-field light generating element so as to leak out.

The disk D is locally heated by the near-field light and the coercivity is temporarily reduced. On the other hand, if a current is supplied to the recording element of the slider 2 by the control unit 5, a recording magnetic field in a direction perpendicular to the disk D can be generated by the principle of an electromagnet. As a result, the information can be recorded by the hybrid magnetic recording method in which near-field light and the recording magnetic field generated in the recording element are made to cooperate with each other.

On the other hand, when reproducing the information recorded on the disk D, the reproduction element which is fixed adjacent to the recording element receives a magnetic field leaking from the disk D and the electric resistance changes according to its size. Accordingly, the voltage of the reproduction element changes. Then, the control unit 5 can detect the change in the magnetic field leaking from the disk D as a voltage change. In addition, the control unit 5 can reproduce the information by reproducing a signal from the voltage change.

Thus, various kinds of information can be recorded and reproduced on and from the disk D using the slider 2.

Here, the slider 2 is supported by the suspension 3 and is also pressed toward the disk D by the predetermined force. Moreover, at the same time, since the floating surface 2a faces the disk D, the slider 2 receives a floating force by an influence of air pressure caused by the rotating disk D. By the balance of both the forces, the slider 2 floats to the position spaced apart from the disk D.

In this case, since the slider 2 is pressed toward the suspension 3 by the air pressure, the pad portion 17b of the gimbal 17 which fixes the slider 2 and the protruding portion 19 formed in the suspension 3 are in point contact with each other. In addition, the floating force is transmitted to the suspension 3 through the protruding portion 19, and it acts to bend the suspension 3 in a Z direction perpendicular to the disk surface D1. As a result, the slider 2 floats as described above. In addition, since the base plate 22 and the load beam 24 are connected to the suspension 3 through the hinge plate 23, it can be easily bent between the base plate 22 and the load beam 24.

Moreover, even if the slider 2 receives air pressure (air pressure in the XY direction) caused by the undulation of the disk D, it is twisted around the X and Y axes through the gimbal means 16, that is, through the pad portion 17b which is in point contact with the tip of the protruding portion 19. Accordingly, since displacement in the Z direction caused by the undulation can be absorbed, the posture of the slider 2 when it floats can be stabilized.

In particular, according to the information recording and reproduction apparatus 1 of the present invention, the laser light source 20 which supplies light beam to the condensing lens of the slider 2 is provided in the base portion 15 of the slider 2. In addition, light beam emitted from the laser light source 20 are guided to the slider 2, which is supported at the distal end of the suspension 3, through the optical waveguide 32. The light beam guided to the slider 2 are condensed by the condensing lens described above and are then introduced into a near-field light generating element. Accordingly, near-field light is incident on the disk D. That is, unlike the case where a light source is directly mounted in the slider 2 in the related art, a possibility that the heat generated from the laser light source 20 when supplying light beam will be transmitted to the slider 2 is very small because light beam are supplied from the laser light source 20, which is provided in the base portion 15, to the slider 2 through the optical waveguide 32. Therefore, an influence of the heat generated from the laser light source 20 can be suppressed.

As a result, in the information recording and reproduction apparatus 1 based on the hybrid magnetic recording method of making the near-field light and the recording magnetic field generated in the recording element cooperate with each other, the slider 2 does not deform by the influences of thermal expansion, warpage, and the like of the slider 2. Accordingly, the floating characteristic of the slider 2 can be maintained.

In addition, since the influence of the heat generated from the laser light source 20 can be suppressed, the characteristic of the reproducing element of the slider 2 can be maintained.

Meanwhile, when the laser light source 20 is disposed in the control unit 5, an optical waveguide is provided in the flat cable 4. If the flat cable is bent to deform, there is a problem in that the guiding loss of light is increased. In the present embodiment, it is not necessary to provide an optical waveguide in the flat cable 4 because the laser light source 20 is provided in the base portion 15 of the carriage 11. Accordingly, the guiding loss of light can be suppressed.

In addition, the laser light source 20 is disposed on the terminal substrate 30 provided in the base portion 15 of the carriage 11. The terminal substrate 30 serves as a relay point with the control unit 5 which controls an operation of the slider 2, and is disposed in the base portion 15 of the carriage 11 from the past. That is, since the laser light source 20 is only disposed on the existing component, it is not necessary to newly dispose a component as a base in the carriage 11 in order to dispose the laser light source 20. As a result, costs can be reduced.

In addition, since the base portion 15 of the carriage 11 is configured so as to be rotatable around the pivot shaft 10, the arm portion 14 can move in a direction parallel to the disk surface D1 with the pivot shaft 10 as the center of rotation. At this time, since the laser light source 20 is provided in the base portion 15, the moment acting on the carriage 11 when the slider 2 moves is small compared with the case where the laser light source 20 is mounted in the slider 2. Accordingly, the tracking accuracy can be maintained.

Thus, according to the information recording and reproduction apparatus 1 in the present embodiment, recording and reproduction of the information can be performed very accurately and correctly by suppressing an influence of the heat generated from the laser light source 20 and suppressing the moment acting on the carriage 11 when the slider 2 moves. As a result, high-density recording can be performed on the disk D.

In addition, by providing the plurality of (for example, three) arm portions 14, the information can be recorded on the plurality of disks D by the slider 2 supported by each arm portion 14. Accordingly, the recording capacity of the information recording and reproduction apparatus 1 itself can be increased. In addition, by providing the laser light source 20 corresponding to each slider 2 of each arm portion 14, the information can be recorded on all magnetic recording media corresponding to the respective sliders 2 by the hybrid magnetic recording method. Accordingly, high-density recording can be performed on each disk D.

In addition, the technical scope of the present invention is not limited to the embodiment described above, but those obtained by modifying the above-described embodiment in various ways without departing from the spirit and scope of the present invention are also included. That is, the configuration and the like mentioned in the above embodiment are no more than examples and may be appropriately changed.

Figure 8:
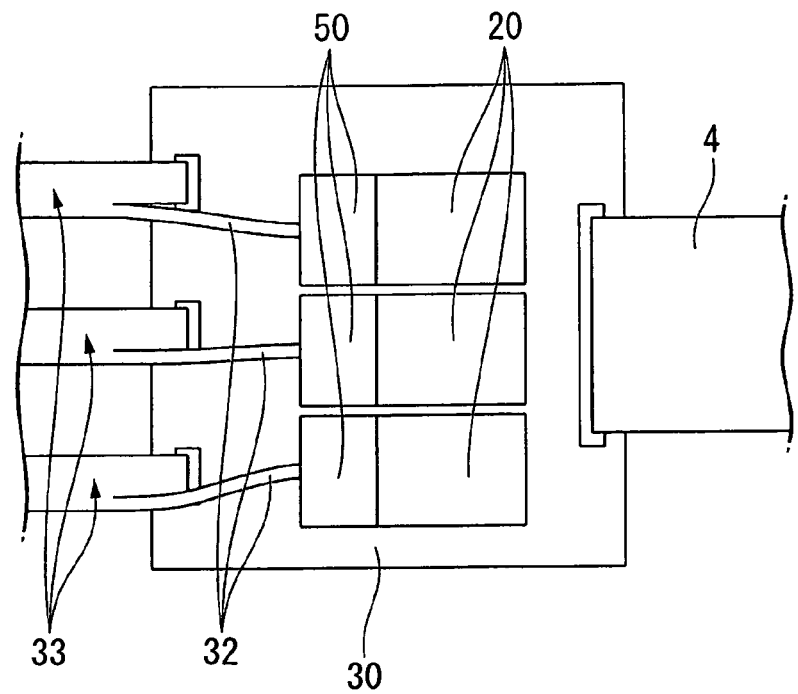
FIG. 8 is a plan view of a terminal substrate showing another embodiment of the information recording and reproduction apparatus related to the present invention.

For example, as shown in FIG. 8, a configuration is also possible in which a polarization controller 50 is fixed to each laser light source 20 and light beam emitted from the laser light source 20 are guided to the condensing lens of the slider 2 (refer to FIG. 1) through the polarization controller 50. In this case, by guiding light beam to the condensing lens after adjusting a polarization component by the polarization controller 50, near-field light generated by the near-field light generating element can be intensively localized. Accordingly, recording can be realized with higher density.

Figure 9:
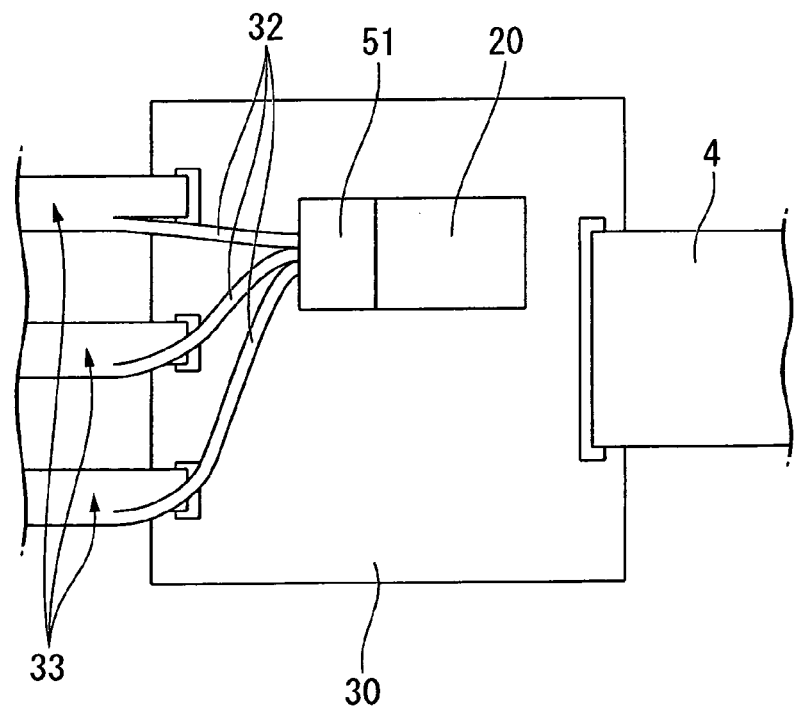
FIG. 9 is a plan view of a terminal substrate showing yet another embodiment of the information recording and reproduction apparatus related to the present invention.

Moreover, in the above embodiment, the configuration was described in which the laser light source 20 was fixed to each slider 2 (refer to FIG. 1). However, as shown in FIG. 9, a configuration is also possible in which the optical waveguide 32 routed from each slider 2 is connected to one laser light source 20 through a switch (optical distributor) 51. In this case, light beam emitted from the laser light source 20 can be supplied to the designated singular or plural sliders 2 by switching of the switch 51. Accordingly, since it is not necessary to provide the laser light source 20 corresponding to the number of sliders 2, costs of the information recording and reproduction apparatus 1 can be reduced.

Figure 10:
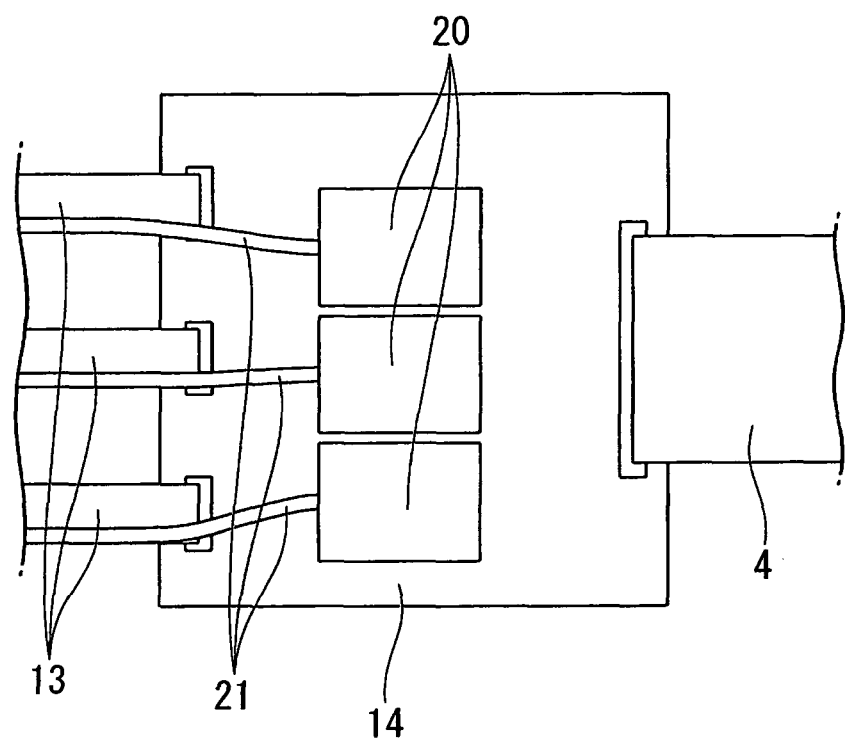
FIG. 10 is a plan view of a terminal substrate showing yet another embodiment of the information recording and reproduction apparatus related to the present invention.

Moreover, in the above embodiment, the configuration was described in which the optical waveguide 32 and the electric wiring line 31 were integrally formed as the photoelectric composite wiring line 33 by sealing them with the cladding 34 as shown in FIG. 6. However, as shown in FIG. 10, the optical waveguide 32 and the electric wiring line 31 may be separately formed.

Moreover, although the air floating type information recording and reproduction apparatus in which a slider was floated was described as an example in each of the embodiments described above, a disk and a slider may be in contact with each other as long as the slider is disposed so as to face the disk surface without being limited to the case. That is, the slider of the present invention may be a contact slider type slider. Also in this case, the same operations and effects can be achieved.

In addition, although the configuration in which a head gimbal assembly was provided only at one surface side of an arm portion was described in the above embodiments, a configuration is also possible in which head gimbal assemblies are provided on both surfaces of an arm portion inserted between disks so as to face each disk. In this case, the information on the disk surface facing each slider can be recorded and reproduced by each slider of the head gimbal assembly provided at both surface sides of the arm portion. That is, since the information of two disks can be recorded and reproduced by one arm portion, it is possible to increase the recording capacity of an information recording and reproduction apparatus and to reduce the size of the apparatus.

REFERENCE SIGNS LIST

D: disk (magnetic recording medium)
D1: disk surface (surface of magnetic recording medium)
1: information recording and reproduction apparatus
2: slider
5: control unit
11: carriage
14: arm portion
15: base portion of carriage
20: laser light source (light source)
30: terminal substrate
32: optical waveguide
50: polarization controller
51: switch (optical distributor)

The invention claimed is:

1. An information recording and reproduction apparatus comprising:
   a magnetic recording medium mounted to undergo rotation in a predetermined direction;
   at least one light source that emits a light beam to heat the magnetic recording medium;
   a pivot shaft disposed outside of the magnetic recording medium;
   a carriage mounted to undergo rotational movement around the pivot shaft, the carriage including a base portion, which is formed so as to be rotatable around the pivot shaft, and at least one arm portion, which is provided to extend from the base portion along a surface of the magnetic recording medium, the base portion being disposed closer to the pivot shaft than the at least one arm portion, and the light source being disposed on the base portion so as to be closer to the pivot shaft than the at least one arm portion;
   at least one suspension configured to be flexibly deformable in a thickness direction and being integrally mounted to a distal end of the at least one arm portion of the carriage; and
   a slider supported by the at least one suspension so as to face the surface of the magnetic recording medium, the slider including an optical system which condenses a light beam emitted from the light source and a spot light generating element which generates spot light from the condensed light beam;
   wherein information is recorded on the magnetic recording medium by heating the magnetic recording medium with the spot light generated by the spot light generating element and causing magnetization reversal by applying a recording magnetic field to the magnetic recording medium.

2. An information recording and reproduction apparatus according to claim 1; further comprising a control unit that controls an operation of the slider, and a terminal substrate that is provided in the base portion of the carriage and that electrically connects the control unit and the slider to each other, the light source being disposed on the terminal substrate.

3. An information recording and reproduction apparatus according to claim 1; further comprising a polarization controller that is integrally mounted to the light source and that adjusts a polarization component of a light beam emitted from the light source.

4. An information recording and reproduction apparatus according to claim 1; wherein the at least one arm portion comprises a plurality of arm portions supported on the base portion, the at least one suspension comprises a plurality of suspensions each having one of the sliders and being mounted to distal ends of respective ones of the plurality of arm portions, and the at least one light source comprises a plurality of light sources corresponding to respective ones of the plurality of sliders.

5. An information recording and reproduction apparatus according to claim 1; wherein the at least one arm portion comprises a plurality of arm portions supported on the base portion, and the at least one suspension comprises a plurality of suspensions each having one of the sliders and being mounted to distal ends of respective ones of the plurality of arm portions; and further comprising an optical distributor integrally mounted to the light source for distributing a light beam from the light source to each of the sliders.

6. An information recording and reproduction apparatus according to claim 1; wherein the at least one light source is disposed on a lateral side of the base portion that is closer to the pivot shaft than the at least one arm portion.

7. An information recording and reproduction apparatus according to claim 1; further comprising an optical waveguide that introduces the light beam emitted from the light source into the slider, and electric wiring lines integral with the optical waveguide and electrically connecting the slider to a control section that supplies a current to the slider.

8. An information recording and reproduction apparatus according to claim 7; further comprising a photoelectric composite wiring line including the optical waveguide and the electric wiring lines; wherein a radius of curvature of the optical waveguide from a distal side of the photoelectric composite wiring line to the slider is larger than a radius of curvature of each electric wiring line.

9. An information recording and reproduction apparatus according to claim 1; wherein the at least one suspension is mounted at the distal end side of the carriage for undergoing movement in a plane parallel to the surface of the magnetic recording medium; and further comprising supporting means for fixedly mounting the slider to a surface of the at least one suspension such that the slider can pivot about two axes that are perpendicular to each other and parallel to the surface of the magnetic recording medium.

10. An information recording and reproduction apparatus according to claim 9; wherein the supporting means for fixedly mounting the slider to a surface of the at least one suspension comprises a pad portion disposed between the at least one suspension and the slider.

11. An information recording and reproduction apparatus according to claim 10; wherein the at least one suspension has a protruding portion configured to be disposed in point contact with an approximate center of the pad portion during pivotal movement of the slider about the two axes parallel to the surface of the magnetic recording medium.

* * * * *